(12) United States Patent
Gurevich et al.

(10) Patent No.: US 7,187,502 B2
(45) Date of Patent: Mar. 6, 2007

(54) COMPACT OPTICAL ASSEMBLY FOR IMAGING A REMOTE OBJECT

(75) Inventors: Igor Gurevich, Saarbrucken (DE); Victor Faybishenko, San Carlos, CA (US); Leonid Velikov, San Carlos, CA (US)

(73) Assignee: Microalign Techologies, Inc., San Carlos, CA (US)

( * ) Notice: Subject to any disclaimer, the term of this patent is extended or adjusted under 35 U.S.C. 154(b) by 0 days.

(21) Appl. No.: 11/148,105

(22) Filed: Jun. 9, 2005

(65) Prior Publication Data

US 2006/0279845 A1 Dec. 14, 2006

(51) Int. Cl.
G02B 27/10 (2006.01)
G03B 9/04 (2006.01)
G03B 21/26 (2006.01)
G03B 27/32 (2006.01)

(52) U.S. Cl. ............ 359/622; 359/621; 359/626; 359/456; 359/754; 396/459; 353/30; 355/22; 250/208.1

(58) Field of Classification Search ............ 359/619, 359/621–623, 626, 455, 456, 741; 396/23, 396/324, 330, 459; 355/22, 34, 77, 132; 372/92, 98, 101, 108; 353/30; 430/946; 250/208.1, 216
See application file for complete search history.

(56) References Cited

U.S. PATENT DOCUMENTS

| 3,447,438 | A | * | 6/1969 | Kaufer et al. ............ 396/459 |
| 3,503,315 | A | * | 3/1970 | Lannes De Montebello ..... 396/330 |
| 3,605,593 | A | | 9/1971 | Anderson |
| RE28,162 | E | | 9/1974 | Anderson |
| 5,302,989 | A | * | 4/1994 | Taguchi et al. ............ 355/22 |
| 5,661,747 | A | * | 8/1997 | Hiiro ............ 372/101 |
| 5,798,866 | A | * | 8/1998 | De Vaan ............ 359/621 |
| 5,876,322 | A | * | 3/1999 | Piramoon ............ 494/16 |
| 5,956,163 | A | | 9/1999 | Clarke et al. |
| 6,057,538 | A | | 5/2000 | Clarke |
| 6,400,505 | B1 | * | 6/2002 | Funazaki et al. ............ 359/456 |
| 6,462,870 | B2 | * | 10/2002 | Funazaki et al. ............ 359/456 |
| 6,473,238 | B1 | * | 10/2002 | Daniell ............ 359/622 |
| 6,587,276 | B2 | * | 7/2003 | Daniell ............ 359/622 |
| 6,721,101 | B2 | * | 4/2004 | Daniell ............ 359/626 |

FOREIGN PATENT DOCUMENTS

GB        541753        12/1941

OTHER PUBLICATIONS

U.S. Appl. No. 11/079,549, 2005, Igor Gurevich et al.
R. Anderson: "Close-up Imaging of Documents and Displays with Lens Arrays", Applied Optics, vol. 18, No. 4, pp. 477-484.

(Continued)

Primary Examiner—Loha Ben

(57) ABSTRACT

The optical system of the invention is comprised of a monolithic microlens array assembly that consists of two groups of microlenses sub-assemblies having different pitches between the adjacent lenses. A ratio between the pitches of sub-assemblies is determined by a predetermined relationship between the parameters of the optical system so that the microlenses of the first sub-assembly create a plurality of individual intermediate images arranged side-by-side in a common intermediate plane that are transferred by the microlenses of the second sub-assembly to the final image plane in the form of a plurality of identical and accurately registered images interposed onto each other. This is achieved due to the aforementioned ratio between the pitches.

19 Claims, 13 Drawing Sheets

OTHER PUBLICATIONS

R. Volkel, et al."Microoptical telescope eye", Feb. 7, 2005, vol. 13, No. 3, Optics Express 889.

Artificial compound eye—different concepts and their application to ultra flat image acquisition sensors, by J. Duparre, et al., Microoptics SA, Switzerland.

* cited by examiner

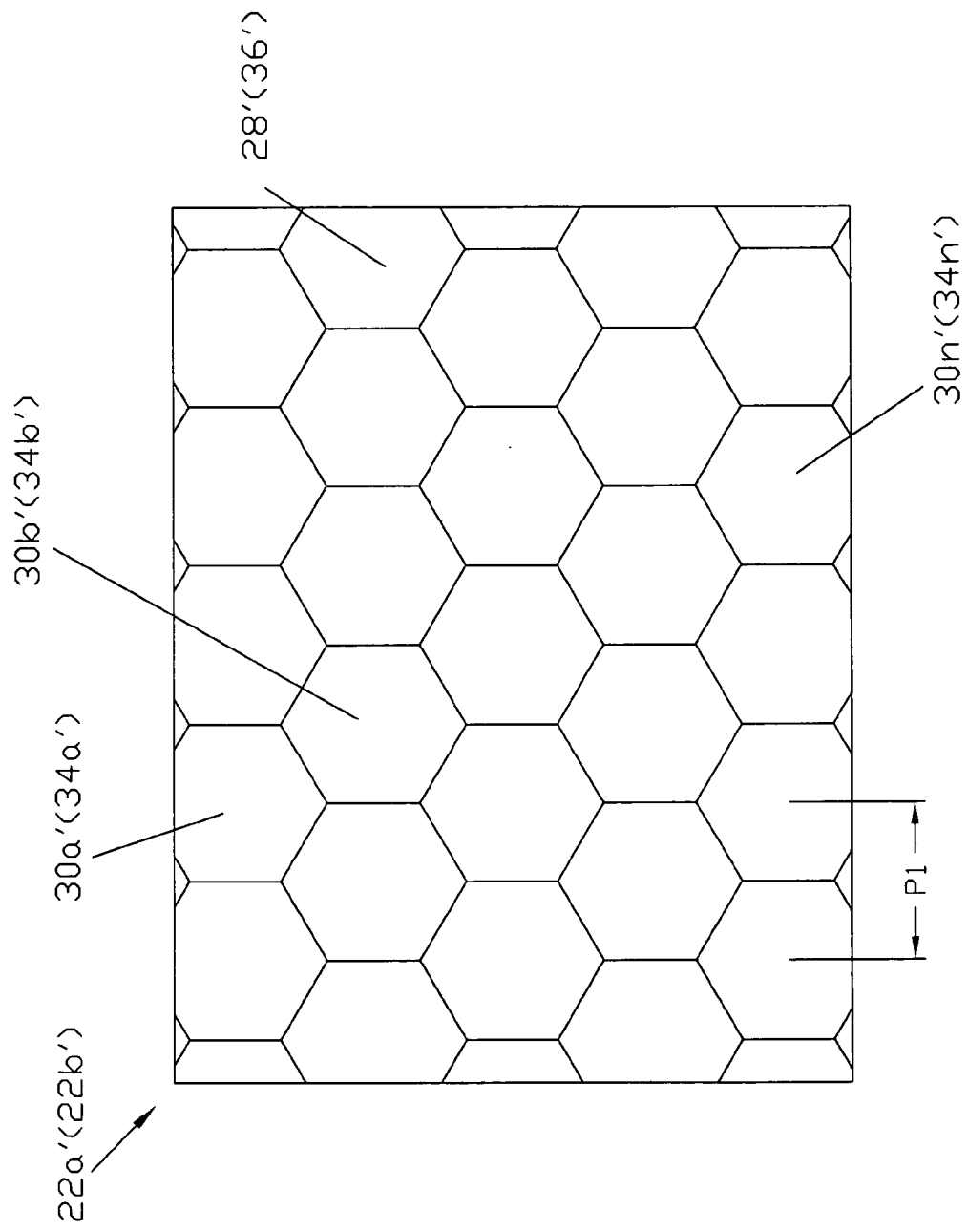

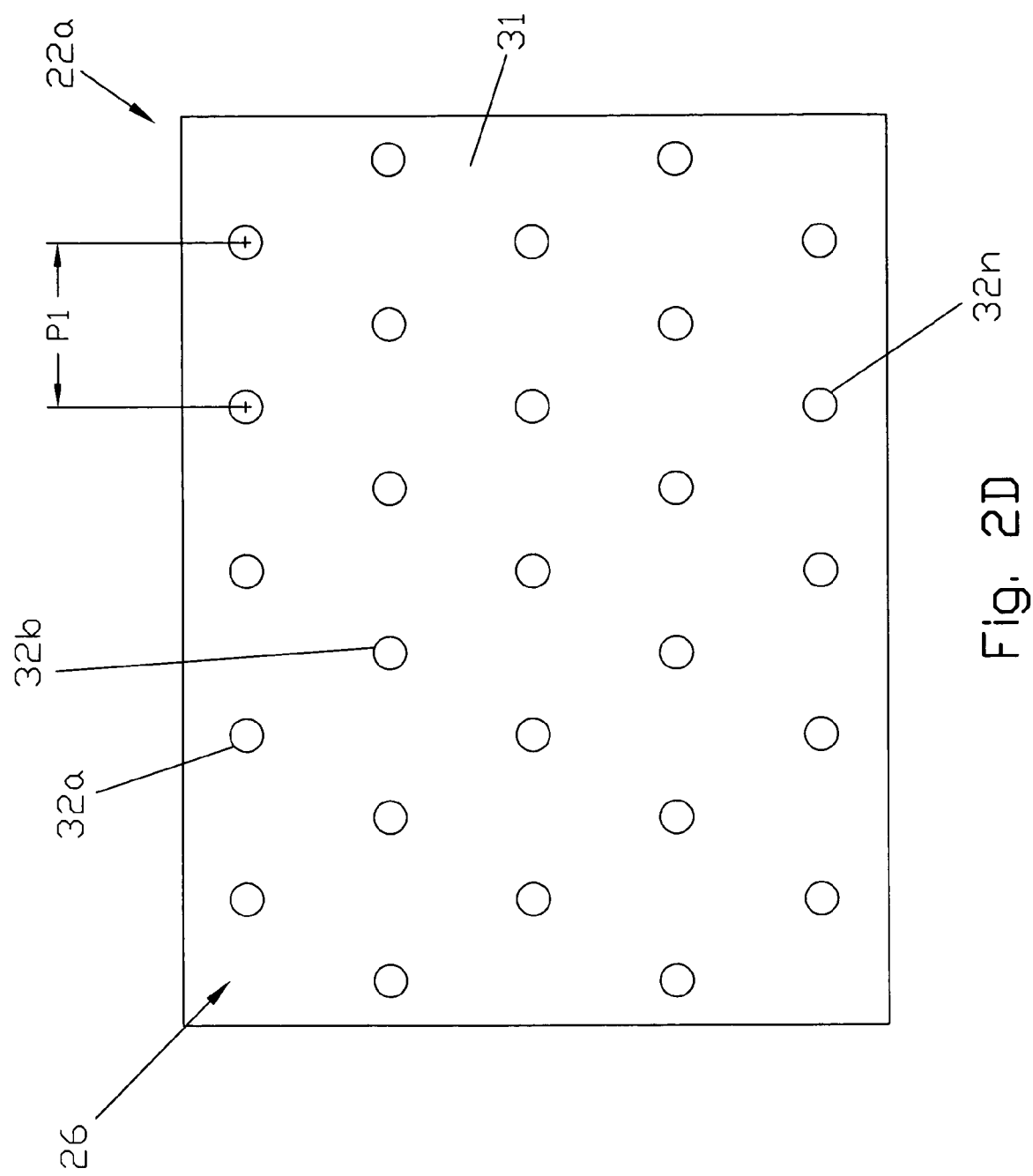

COMPACT OPTICAL ASSEMBLY FOR IMAGING A REMOTE OBJECT

CROSS-REFERENCE TO RELATED APPLICATIONS

The present patent application is related to U.S. patent application Ser. No. 10/862,178 filed by the same applicants on Jun. 7, 2004 and entitled "Flat Wide-Angle Lens System", U.S. patent application Ser. No. 10/893,860 filed by the same applicants on Jul. 19, 2004 and entitled "A Wide-Angle Objective", U.S. patent application Ser. No. 11/075,253 filed by the same applicants on Mar. 9, 2005 and entitled "Compact Optical Assembly for Undistorted Imaging", and U.S. patent application Ser. No. 11/079,549 filed by the same applicants on Mar. 14, 2005 and entitled "Contact-Type Monolithic Image Sensor".

FIELD OF THE INVENTION

The present invention relates to the field of optics, in particular, to the structure and manufacture of compact optical assemblies, e.g., thin monolithic optical systems assembled from microlens arrays for use in the field of photography, photolithography, image sensing, image-digitization, machine-vision systems, etc. More specifically, the invention concerns an optical objective in the form of a monolithic microlens array assembly of high light-transmission efficiency for imaging remotely located objects, i.e., objects located behind the focal distance of the assembly.

BACKGROUND OF THE INVENTION

Interest to microlens array systems arose in the beginning of 60's, when it was found that the optical systems assembled from microlens arrays make it possible to achieve a number of optical characteristics, such as a large ratio of an input optical aperture to the depth of the system, unattainable in conventional photographic cameras. This made it possible to create optical systems of high compactness.

In this connection, reference can be made to U.S. Pat. No. 3,447,438 issued in 1969 to H. Kaufer, et al. and U.S. Pat. No. 3,605,593 issued in 1971 and reissued in 1974 as U.S. Pat. No. Re. 28,162 to R. Anderson. These patents for the first time have explicitly formulated possibility of reducing the length of the system in the direction of the optical axis and thus improving the system's compactness due to the use of lens arrays.

Only much later, i.e., in 90's and in the beginning of 2000's, lens and microlens arrays have found application in designs relating to photolithography, image-sensing, image digitization, etc. The development history of contact-type optical systems based on the use of microlens arrays is described in aforementioned U.S. Pat. application Ser. No. 11/075253.

In fact, the main optical approach used practically in all previous patents of the aforementioned category has been formulated in a much earlier article of R. Anderson issued under the title "Close-up Imaging of Documents and Displays with Lens Arrays" in Applied Optics, Vol. 18, No. 4, pp. 477–484.

Anderson's objective was creation of a photo camera for registering images of an oscilloscopic tube. At a design stage, however, it was understood that the system developed by the author could find a much wider practical application. As it is stated in the article, in many close-up imaging systems, e.g., in document copier machines, the housing or structural body of the imaging system extends over the entire length of the optical path from the object to the image. The shortest normal optical path length of such a system is the one associated with 1× magnification, where the image and the object are each at a distance of four focal lengths from the lens, and the total optical path length is equal to eight focal lengths plus some distance that corresponds to the total thickness of optical elements. This is because an intermediate image has to be formed between the final image plane and the object. Accordingly, those systems are several times as long as a general-purpose distant object camera having a lens of the same focal length, where the camera body extends only over an image distance of about one focal length. R. Anderson showed that by assembling the optical system from microlens arrays it was possible to significantly shorten the total length of the optical system in the optical axis direction. This short length is one of the optical properties of two parallel arrays of simple lenses arranged in rows and columns. The new optical system may have wider use than oscilloscope photography, however, unlike conventional optics, the length of the system does not increase with an increase in the size of the object field to be covered. Imaging of larger objects such as copier machine documents or computer peripheral displays requires larger lens arrays, but does not require a longer optical system.

In principle, a lens-array optical system used, e.g., for very close-up photography of large object, would be photographing simultaneously small sections of the large object with an array of many cameras arranged in rows and columns, where each camera has only a limited field of coverage. The resulting separate photographs obtained in such a process could be assembled together, while each lens of the array functions as an objective of each individual camera.

One may think that it would be much easier to combine the film-backs of all the cameras into a single larger film-back faced by an array of lenses in a common lens-board. However, each coaxial lens set is intended for inverting and reverting its portion of the image relative to the object, while the combined inversion or reversion of the composite image will not produce a real image. Where the adjacent inverted images meet or overlap a distortion occurs since in the overlapped areas images are not of the same object points.

In his article, R. Anderson analyzes the sources of the aforementioned overlapping on the edges of the individual images and offers a method for attenuating the overlapping. In conclusion of his work, R. Anderson formulates the following dominant principles required for the formation of correct images: 1) the image plane must coincide with the plane of coincidence, i.e., the plane where edges of adjacent images coincide and thus overlap each other; 2) the lens-pair magnification must equal the composite image magnification; and, 3) in symmetrical systems, the object distance (i.e., the distance from the object to the first lens array) equals the coincidence plane distance (i.e., the distance from the second lens array to the coincidence plane that coincides with the focal plane of the second lens array). In order to provide short length and large image area combined with good brightness, contrast, and resolution, the parallel lens arrays should have dimensions which satisfy the requirements of Items 1)–3).

Based on the principles formulated in the aforementioned article, R. Anderson developed an optical apparatus with a short longitudinal length that included a pair of microlens arrays (that are called by the inventor as mosaics) of optical imaging elements. This apparatus is disclosed in Anderson's U.S. Pat. No. Re. 28,162 issued in 1974 that, in addition to the features described in the article, also includes an adjustable stop for each microlens for limiting the light-passing apertures as a measure of restricting partial image overlapping or for increasing the apertures in order to join the boundaries of the adjacent images and thus to form a large continuous image.

A similar problem was solved in aforementioned U.S. Pat. No. 3,447,438 of Kaufer et al. that relates to an optical system having at least two lenticular screens. In fact, each screen is a lens array. Furthermore, the system is provided with a diaphragm array arranged between the lens arrays and having each diaphragm opening coaxial with respective coaxial lenses. However, the aperture-adjusting mechanism of Kaufman is different from that of R. Anderson, and adjustment of the apertures is carried out by performing relative movements of two plates with overlapping openings that determine a degree of opening of the diaphragms.

Two last-mentioned patents have demonstrated all the advantages resulting from application of optical lens arrays for creating compact optical systems. However, it is understood that the principle of mechanical adjustment of apertures on individual lenses, even though combined into an array, is inapplicable to microlenses of microlens arrays, where lenses have characteristic dimensions in the range of hundred microns or less.

Optical microlens assemblies with dimensions of several ten to several hundred microns were introduced into practical use in 1990's. In these systems, the optical-signal receiving elements were implemented in the form of CCD or CMOS arrays with pixel dimensions equal to or smaller than the size of the microlens. The aforementioned pixels had dimensions from several microns to several ten microns. It is obvious that in such systems the problem of eliminating overlapping between the adjacent images created by neighboring microlenses or joining spaced adjacent images into a single big image becomes even more exaggerated. This is because the mechanical aperture-adjustment mechanisms for adjusting individual lens apertures become practically impossible in view of microscopic dimensions in diametrical and thickness directions.

A trivial attempt of solving the above problem is described in aforementioned U.S. Pat. No. 6,057,538 of J. Clarke. It was suggested to reduce overlapping of adjacent images by reducing the microlens diameters and by masking the spaces between the microlenses with light-blocking coating in order to restrict the aperture of the microlens opening and thus to eliminate overlapping. An additional measure for preventing undesired image overlapping is the use of a matrix of vertical walls for limiting lateral illumination of correct images. Although such measures as reducing the size of the microlenses, masking, or shielding the side illumination produce some effect, this is achieved at the expense of light efficiency that is diminished.

However, none of the references mentioned above offer a method or system that allows substantially complete elimination of overlapping of individual images produced by individual lenses or microlenses. For example, according to the principle described in the aforementioned article of R. Anderson, minimization of overlapping is carried out exclusively by selecting appropriate distances between the planes of lenses and the image plane. The function of diaphragms in such a system was fulfilled by apertures of microlenses themselves, and spaces between them were masked. The system described in the aforementioned patents of R. Anderson and H. Kaufer contained diaphragms located practically in the planes of lens arrays. All these diaphragms had cross-sectional shapes that could not completely eliminate at least partial overlapping of adjacent images produced by adjacent lenses. In some systems, the apertures of these diaphragms could be mechanically adjusted. However, the principle of such adjustments is absolutely inapplicable at the microlens assembly level. Inevitable overlapping did not allow obtaining of non-distorted images.

The applicants have solved the above problems by providing a thin monolithic image sensor disclosed in aforementioned U.S. patent application Ser. No. 11/079549. The sensor is comprised of a laminated solid package composed essentially of an optical layer and an image-receiving layer placed on the top of the optical layer. The optical layer also comprises a laminated structure composed of at least an optical microlens-array sublayer and an aperture-array sublayer. The image-receiving layer is a thin flat CCD/CMOS structure that may have a thickness of less than 1 mm. The image digitized by the CCD/CMOS structure of the sensor can be transmitted from the output of the image-receiving layer to a CPU for subsequent processing and, if necessary, for displaying. A distinguishing feature of the aforementioned sensor is that the entire sensor, along with a light source, has a monolithic structure, and that the diaphragm arrays are located in planes different from the plane of the microlens array and provide the most efficient protection against overlapping of images produced by neighboring microlenses.

Although the above sensor is capable of producing a non-distorted image with substantially complete elimination of overlapping of individual images produced by individual lenses or microlenses, the use of the aforementioned sensor is limited to specific applications where the sensor is to be in contact with the object to be reproduced. In other words, the sensor of U.S. patent application Ser. No. 11/079549 cannot reproduce an image of an object located at infinity.

An attempt of imaging a remote object with the use of a microlens array system is described in a series of article and patents by R. Volkel, et al. (see, for example, "Microoptical telescope eye" by R. Volkel, et al., 7 Feb. 2005, Vol. 13, No. 3, OPTICS EXPRESS 889). In his work, R. Volkel refers to GB Patent No. 541753 of D. Gabor published as early as 1941. In his patent, D. Gabor for the first time introduced a concept of a so-called superlens that is now known as the Gabor superlens. The Gabor superlens comprises an imaging system of two microlens arrays. Respective microlenses of both microlens arrays have parallel optical axes, but the pitches of the microlenses in both arrays are different and neither an integral multiple of the other. The separation of the arrays is equal to the algebraic sum of their local lengths, if both the arrays are transmitting or, if one of the arrays is reflecting or backed by a plane reflector, is equal to the algebraic sum of twice the focal length of the reflecting microlenses and the focal length of the others. D. Gabor showed that the arrays are equivalent to "superlenses" causing parallel incident light to emerge in parallel or nearly parallel bundles which unite to form "superfocal" lines much smaller in number than the number of microlenses in the arrays. Under certain condition or relations between the focal distance and pitches of microlenses in both arrays only one "superfocus" is formed. In his patent, D. Gabor considered such a condition and showed how to register all individual images produced by a plurality of microlenses into a single image.

Much later R. Volkel, et al. used the Gabor's superlenses for creating a single image from a plurality of individual images converged into a common point. For improving quality of images, R. Volkel, et al. introduced diaphragms in the plane of microlenses and offered to eliminate or reduce image distortion due to the use of anamorphotic microlenses, e.g., elliptical microlenses.

Similar to the Gabor's system, the Volkel, et al. system comprises a number of microlens arrays arranged in series with sequentially reduced pitches between the adjacent microlenses. The microlenses that are aligned, i.e., arranged in the same microlens channel, represents an elemental optical system for building an elemental image of a remotely located object. It is understood that the number of such elemental images is equal to the number of microlens channels, i.e. to the number of microlenses in each array. The optical axes of the aforementioned elemental microlens channels converge in a single point located in the image plane. In other words, the creation of the final image of the remote object is reduced to interposition of all elemental images onto each other in the image plane. A main disadvantage of the aforementioned approach is that each microlens channel, especially the microlens channels on the peripheries of the arrays, form optical systems composed of microlens sequence with the planes of the lens not perpendicular to the planes of the lenses, i.e., to the planes of the arrays. As a result, all microlens channels (except for the central one), and especially peripheral channels, are subject to violation of paraxiality of rays. This means that the individual images created by the peripheral microlenses will be distorted. It is understood that dimensions of the final image and the total aperture of the arrayed system are in contradiction, and this contradiction is fundamental. This contradiction significantly limits design capabilities for practically acceptable systems. As mentioned above, an improvement introduced by R. Volkel into the Gabor's system is the use of diaphragms that, similar to the Anderson's system, restrict the microlens apertures and prevent the edge overlapping. Another improvement is a modified shape of the microlenses by introduction of anamorphotic lenses to compensate distortions, especially on the edges. Nevertheless, in spite of the fact the Volkel's, et al. system was the first microlens system for imaging a remote object, this system had significant limitations with regard to the field of view (FOV) and could not be implemented with fields of view exceeding, e.g., 10°, i.e., could be used essentially only in telescopic optical systems. This is a significant drawback that limited practical applications of the system.

SUMMARY OF THE INVENTION

It is an object of the present invention to provide an optical system in the form of a monolithic microlens array assembly of high light-transmission efficiency for undistorted imaging of remotely located objects. It is another object to provide aforementioned optical system having a total optical path length much shorter than the conventional optical systems of the same optical characteristics. Still another object is to provide the aforementioned system that can be easily matched with standard image receiving and processing units such as CCD/CMOS, or any other arrayed receiver. Another object is to provide the aforementioned system that can be embodied with optical characteristics selected in a wide range without limitations to apertures, images sizes, field views, etc.

The optical system of the invention is comprised of a monolithic microlens array assembly of high light-transmission efficiency that has an extremely short total optical path length with a diameter/length ratio of 10 or higher. The assembly consists of two groups of microlenses sub-assemblies. In each sub-assembly, the microlenses have the same pitch, while in different sub-assemblies the pitches are different. A ratio between the pitches of sub-assemblies is determined by a predetermined relationship between the parameters of the optical system. The microlenses of the first sub-assembly create a plurality of individual intermediate images arranged side-by-side in a common intermediate plane with the same pitch as the pitch of the first sub-assembly of the microlenses. The aforementioned common intermediate plane is arranged between both microlens sub-assemblies. Dimensions of the individual intermediate images in the intermediate plane are limited by field-limitation diaphragms of the field-limitation diaphragm array formed on the back side of the first sub-assembly. Applied onto the front side of the first sub-assembly is an aperture-limitation diaphragm array with aperture-limitation diaphragms. In each microlens channel, the diaphragms of both types are coaxial. The diaphragms provide the condition of telecentricity of light beams in microlens channels of the system. Furthermore, the field-limitation diaphragms limit the field of the final image in the image plane for matching with the transverse dimensions of the image receiving element. The second sub-assembly of the microlenses has the pitch smaller than the pitch of the first sub-assembly. The second sub-assembly provides magnification of the individual images of the intermediate plane to the size of the final image that, as mentioned above, may be matched with the transverse dimension of the image-receiving element. Thus, each microlens channel of the second sub-assembly creates an enlarged final image of the remote object with superposition of these enlarged images onto each other. The accurate registering of the superimposed images is provided by the aforementioned predetermined pitch ratio and dimensions of apertures within the limits of the focus depth of the second sub-assembly. The second sub-assembly also may be provided with aperture-limitation diaphragms located on the image-receiving side of this sub-assembly and fulfilling the same function as the aperture-limitations diaphragms of the first sub-assembly. Accuracy of interposition of individual final images is extremely high, since it depends only on the accuracy of the pitch ratio between the microlens channels and the deviation of the pitch in the array itself. As the current technology allows manufacturing of microlens arrays with pitch deviations of the order of the wavelength, it can be assumed that accuracy of interposition also will be of the order of diffraction distortion.

BRIEF DESCRIPTION OF THE DRAWINGS

FIG. 2C is a view similar to FIG. 2B that illustrates the hexagonal shape of microlenses.

FIG. 2D is similar to FIG. 2A but illustrating only the input aperture-limitation diaphragms.

DETAILED DESCRIPTION OF THE INVENTION

Figure 1:
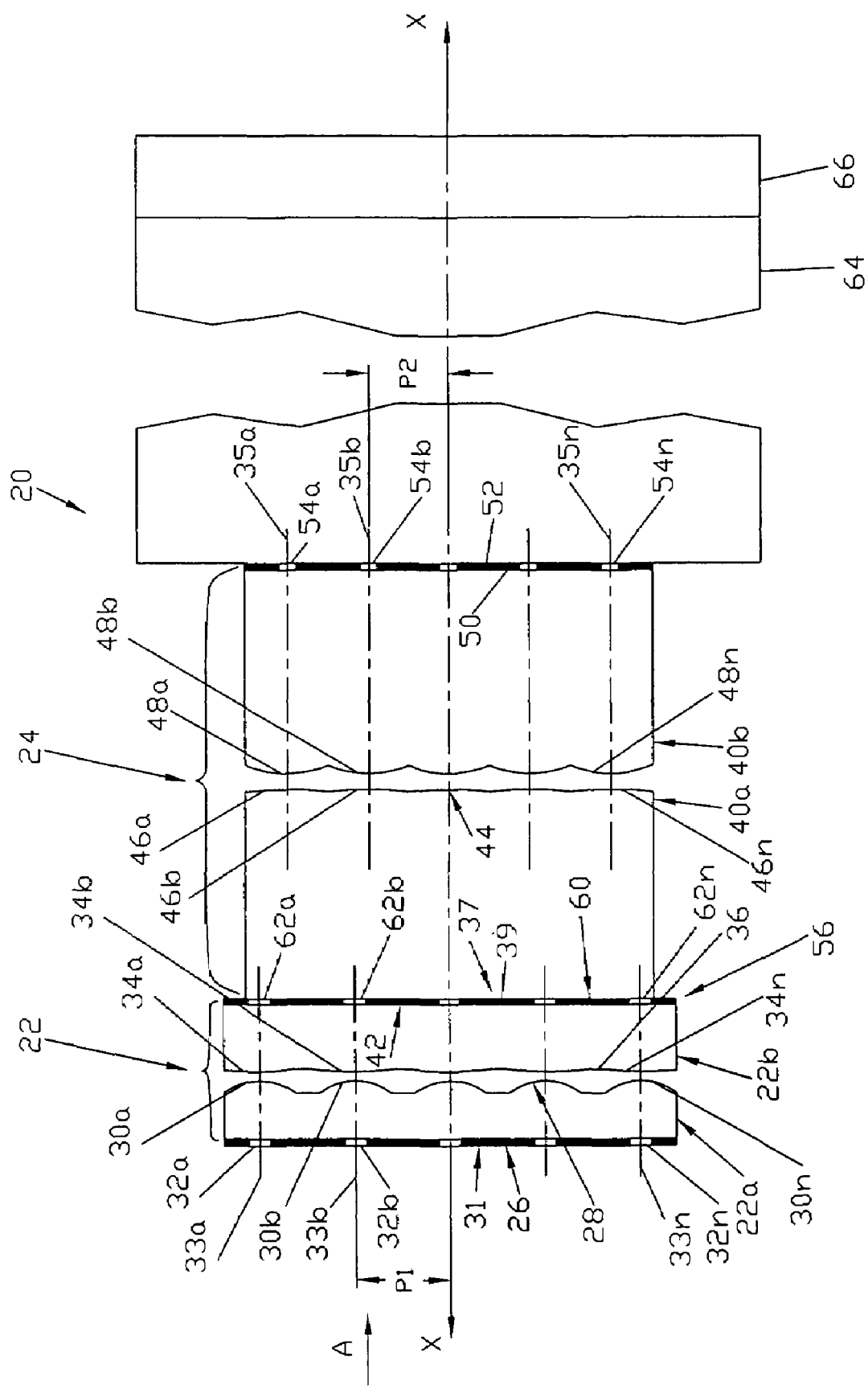
FIG. 1 is a schematic general view of a compact optical assembly of the invention for imaging a remote object.

A general view of a compact optical assembly 20 of the invention for imaging a remote object (not shown) is shown in FIG. 1. The optical assembly 20 consists of a first microlens sub-assembly 22 and a second microlens sub-assembly 24. Both sub-assemblies 22 and 24 are arranged along a main optical axis X—X.

In the context of the present patent application, the term "microlens" designates those optical lenses of small dimensions that are arranged in arrays. It is understood that there no principle differences between lenses and microlenses, except for dimensions.

The first microlens sub-assembly 22 consists of two interposed microlens arrays 22a and 22b. The first microlens array 22a comprises a plate of an optical material, e.g., of glass, that has a flat front surface 26 that faces the remote object, not shown, the image of which shall be reproduced by the optical assembly 20, and a rear surface 28 with a plurality of microlenses 30a, 30b, . . . 30n. The microlenses 30a, 30b, . . . 30n are arranged in a plane perpendicular to the main axis X—X with an equal pitch P1. In the specific embodiment described in the present patent application, the microlenses 30a, 30b, . . . 30n are aspherical microlenses the characteristics of which will be given later in a specific example of the materials and geometry of optical components of the assembly 20. The aspherical microlenses 30a, 30b, . . . 30n have optical axes 33a, 33b, . . . 33n, respectively, and are negative with respect to the object as their convex sides face away from the object.

Figure 2A:
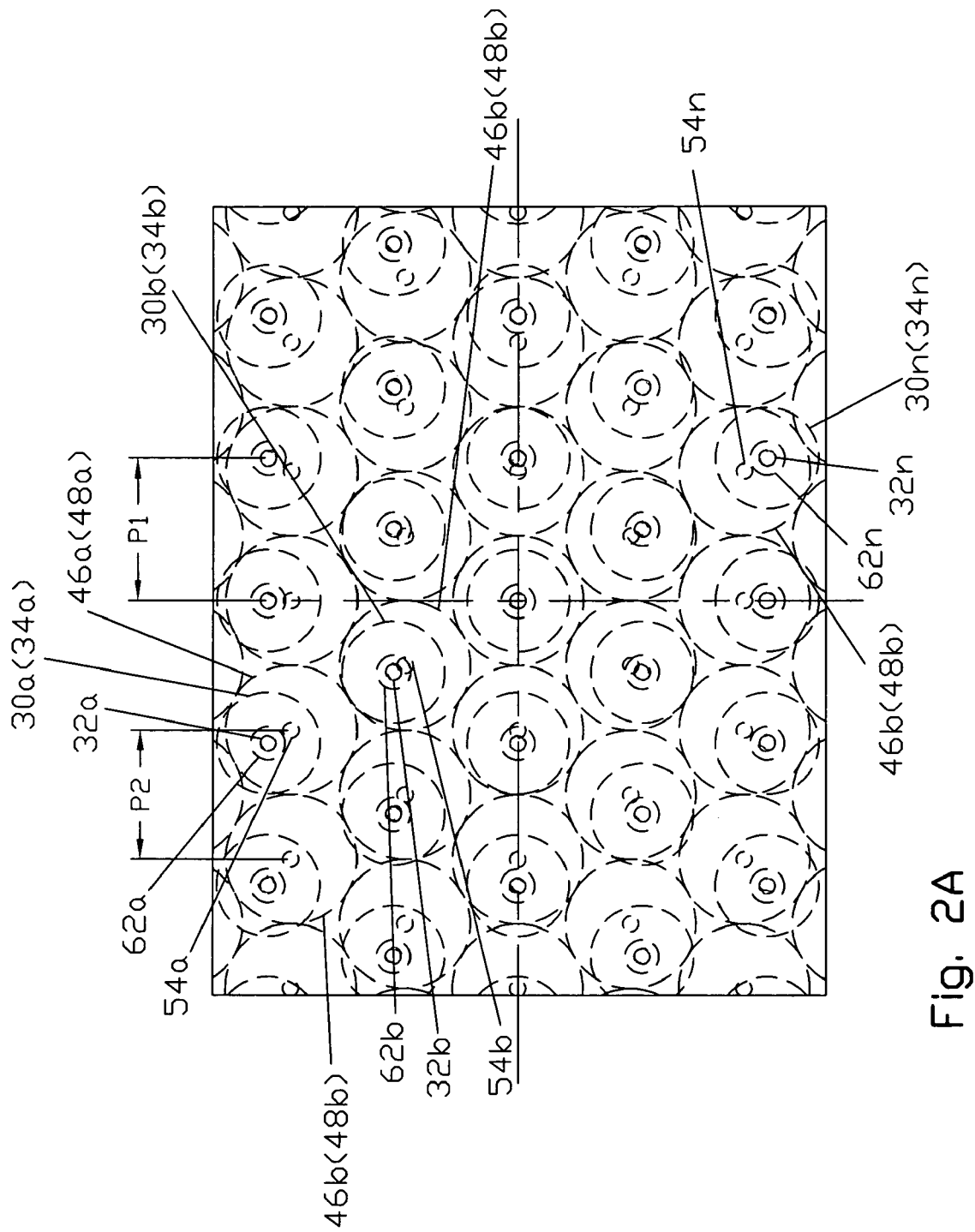
FIG. 2A is a view in the direction of arrow A of FIG. 1, where microlenses and diaphragms are shown by broken lines since in this view they are located behind a light-impermeable coating.
Figure 2B:
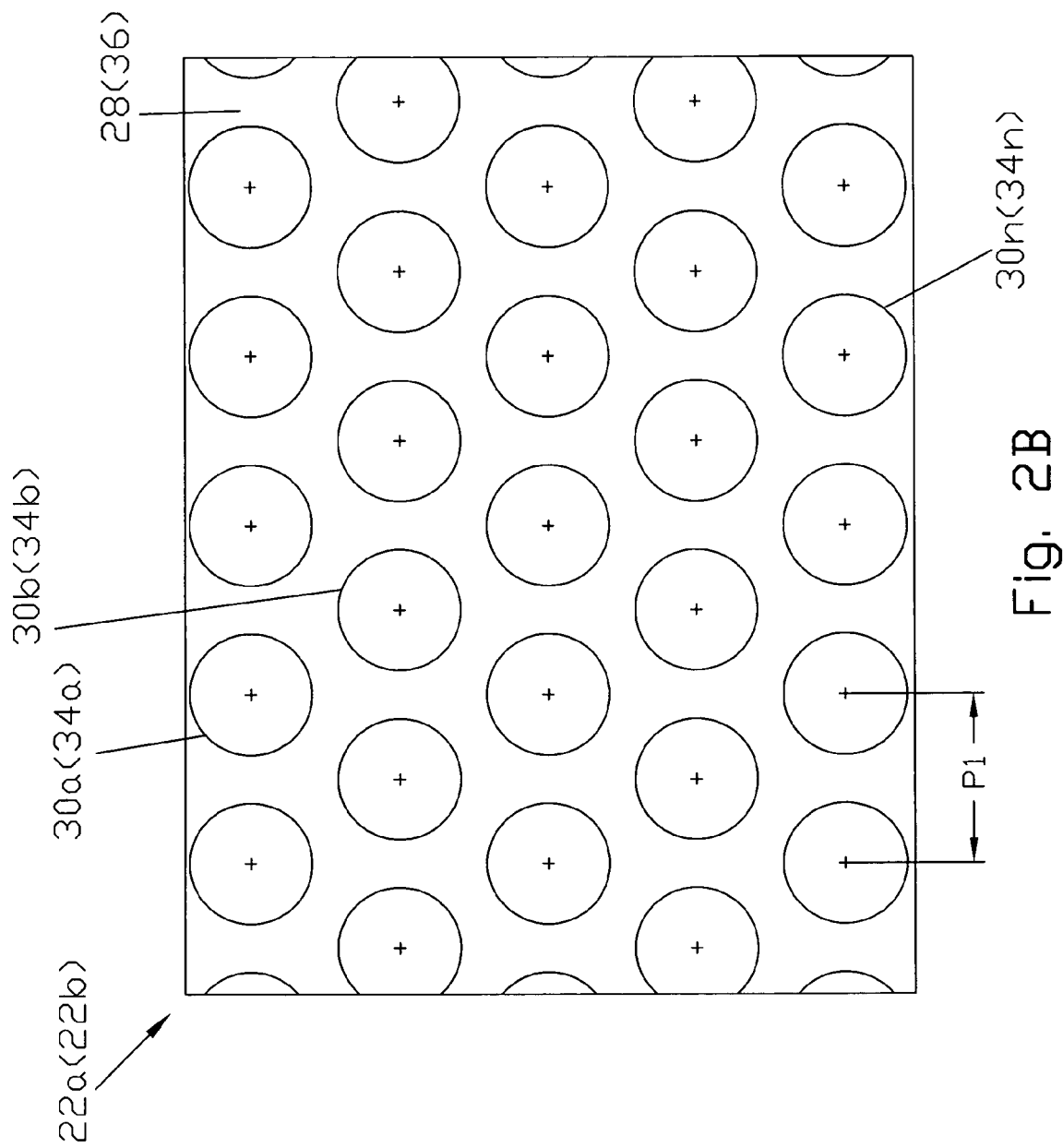
FIG. 2B is a view similar to FIG. 2A that illustrates the circular shape of microlenses.

Applied on the front surface 26 of the first microlens assembly is a light-impermeable coating 31 with openings that constitute aperture-limitation diaphragms 32a, 32b, . . . 32n that are coaxial with the respective microlenses 30a, 30b, . . . 30n, respectively, and therefore are arranged with the same pitch P1. The arrangements of the diaphragms and microlenses are shown in FIGS. 2A and 2B, which are views in the direction of the arrow A in FIG. 1. In FIG. 2A, the microlenses and diaphragms are shown by broken lines since in the direction of view along arrow A (FIG. 1) they are located behind a light-impermeable coating 31.

The second microlens array 22b comprises a plate of an optical material, e.g., of glass, with a plurality of aspherical microlenses 34a, 34b, . . . 34n on the front side 36 of the microlens array 22b. The rear side of the microlens array 22b is designated by reference numeral 37. The microlenses 34a, 34b, . . . 34n are positive with respect to the object, i.e., face the object with their convex sides, and are coaxial to the respective microlenses 30a, 30b, . . . 30n, i.e., have the same optical axes 33a, 33b, . . . 33n. The microlenses 34a, 34b, . . . 34n are arranged with the same pitch P1 as the microlenses 30a, 30b, . . . 30n, respectively, of the first microlens array 22a. The microlenses 34a, 34b, . . . 34n are shown in FIG. 2A conventionally as it is assumed that they have the same diameter as the microlenses 30a, 30b, . . . 30n and therefore their images coincide with the images of the microlenses 30a, 30b, . . . 30n. However, the diameters of microlenses in different microlens arrays may be different. Furthermore, in FIG. 2B the microlenses 30a, 30b, . . . 30n, 34a, 34b, . . . 34n are shown circular only as an example since these microlenses may also have hexagonal shapes as shown in FIG. 2C. In FIG. 2C the respective hexagonal microlenses are designated by reference 30a', 30b', . . . 30n', 34a', 34b', . . . 34n'.

The second microlens sub-assembly 24 consists of two interposed microlens arrays 40a and 40b. The first microlens array 40a comprises a plate of an optical material, e.g., of glass, that has a flat front surface 42 that faces the remote object, not shown, the image of which shall be reproduced by the optical assembly 20, and a rear surface 44 with a plurality of microlenses 46a, 46b, . . . 46n. The microlenses 46a, 46b, . . . 46n (FIG. 1 and FIG. 3A) are arranged in a plane perpendicular to the main axis X—X with an equal pitch P2. In the specific embodiment described in the present patent application, the microlenses 46a, 46b, . . . 46n are also aspherical microlenses the characteristics of which will be given later in a specific example of the materials and geometry of optical components of the assembly 20. The aspherical microlenses 46a, 46b, . . . 46n have optical axes 35a, 35b, . . . 35n, respectively, that are parallel to the optical axes 33a, 33b, . . . 33n of the microlenses 30a, 30b, . . . 30n. The microlenses 46a, 46b, . . . 46n are negative with respect to the object as their convex sides face away from the object. It should be noted that the axes of microlenses in the first and second sub-assemblies 22 and 24 are parallel but do not coincide with each other except for the axes of the central microlenses that may be coaxial (FIG. 1).

The second microlens array 40b of the second sub-assembly 24 (FIG. 1 and FIG. 4) comprises a plate of an optical material, e.g., of glass, with a plurality of aspherical microlenses 48a, 48b, . . . . 48n (FIG. 3A) on the back side 50 of the microlens array 40b. The microlenses 48a, 48b, . . . 48n are positive with respect to the object, i.e., face the object with their convex sides, and are coaxial to the respective microlenses 46a, 46b, . . . 46n, i.e., have the same optical axes 35a, 35b, . . . 35n. The microlenses 48a, 48b, 48n are arranged with the same pitch P2 as the microlenses 46a, 46b, . . . 46n, respectively, of the first microlens array 40a.

Figure 3A:
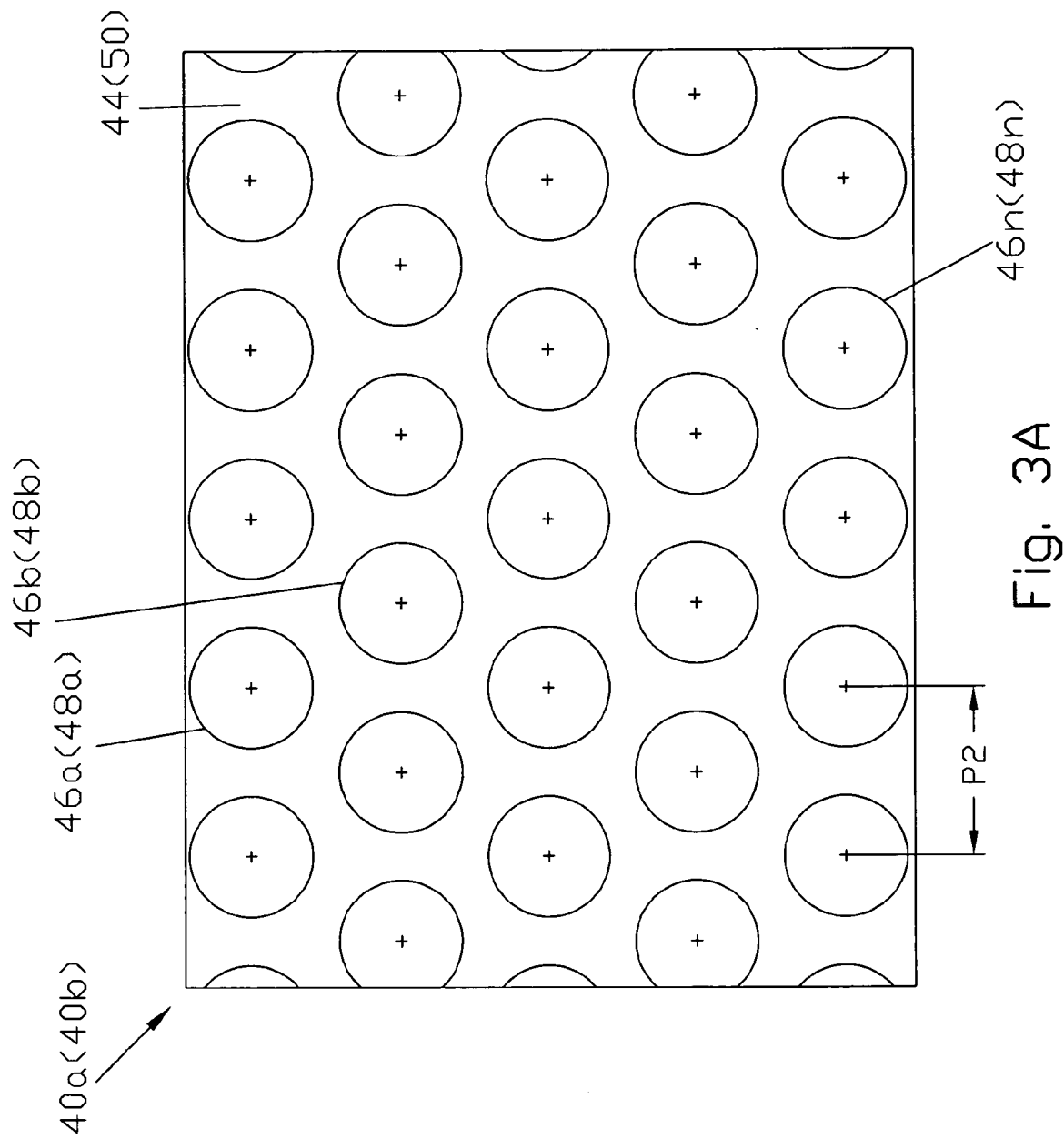
FIG. 3A is a view similar to FIG. 2B that shows the circular shape of the microlenses of the second sub-assembly in the direction opposite to arrow A.
Figure 3B:
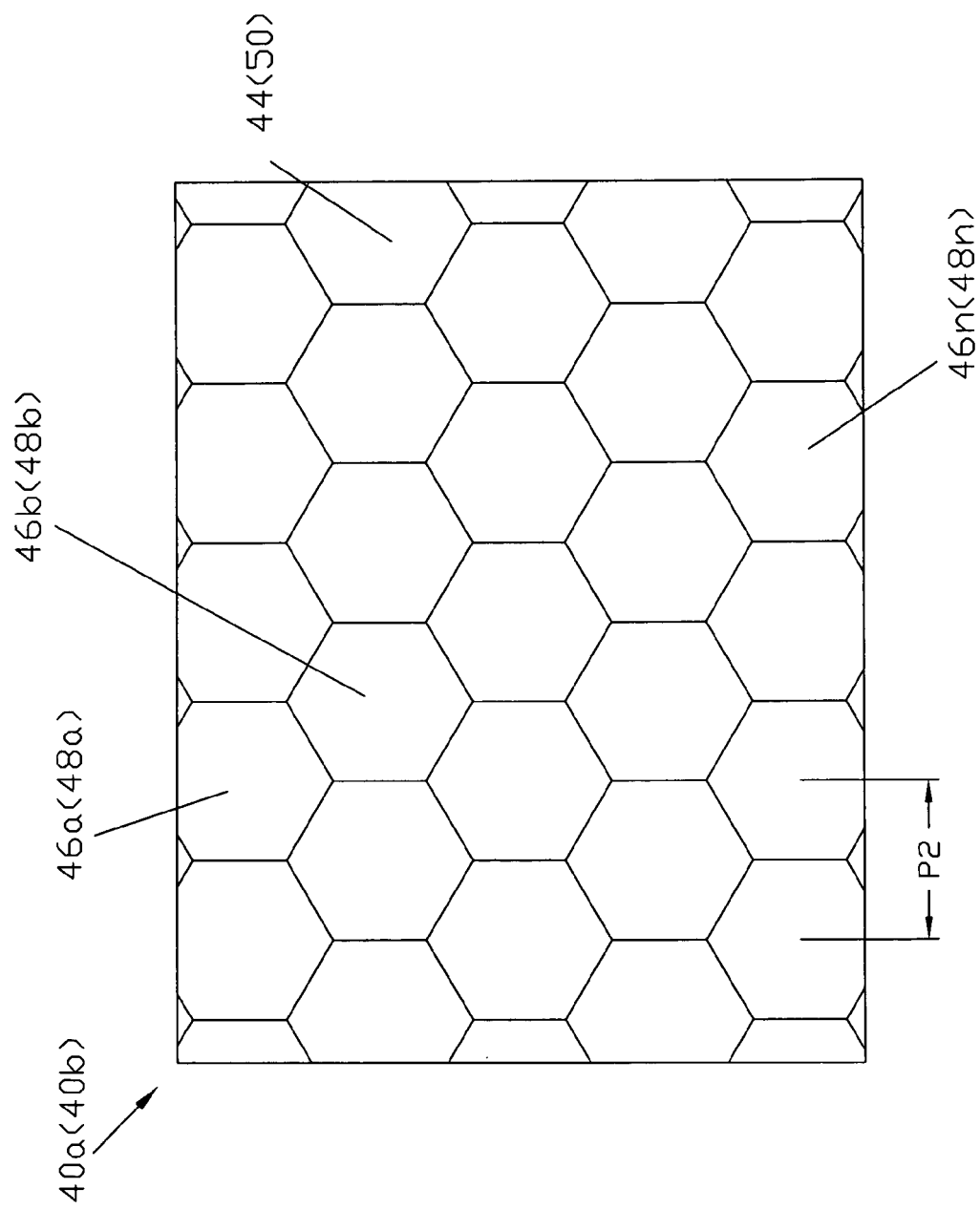
FIG. 3B is a view similar to FIG. 3A that shows the hexagonal shape of the microlenses of the second sub-assembly in the direction opposite to arrow A.

Similar to the microlenses of the first sub-assembly, the microlenses 46a, 46b, . . . 46n, 48a, 48b, . . . 48n may have circular or hexagonal shapes of the types shown in FIGS. 3A and 3B. The respective hexagonal microlenses shown in FIG. 3B are designated by the same reference numerals as the round one but with an addition of a prime, i.e., 46a', 46b', . . . 46n', 48a', 48b', . . . 48n'.

Pitch P2 of the second microlens sub-assembly 24 is smaller than Pitch P1 of the first microlens assembly 22. Microlenses 46a, 46b, . . . 46n, 48a, 48b, . . . 48n of the sub-assembly 24 are greater in their cross-sectional dimension than the microlenses 30a, 30b, . . . 30n and 34a, 34b, . . . 34n of the first sub-assembly 22.

Figure 3C:
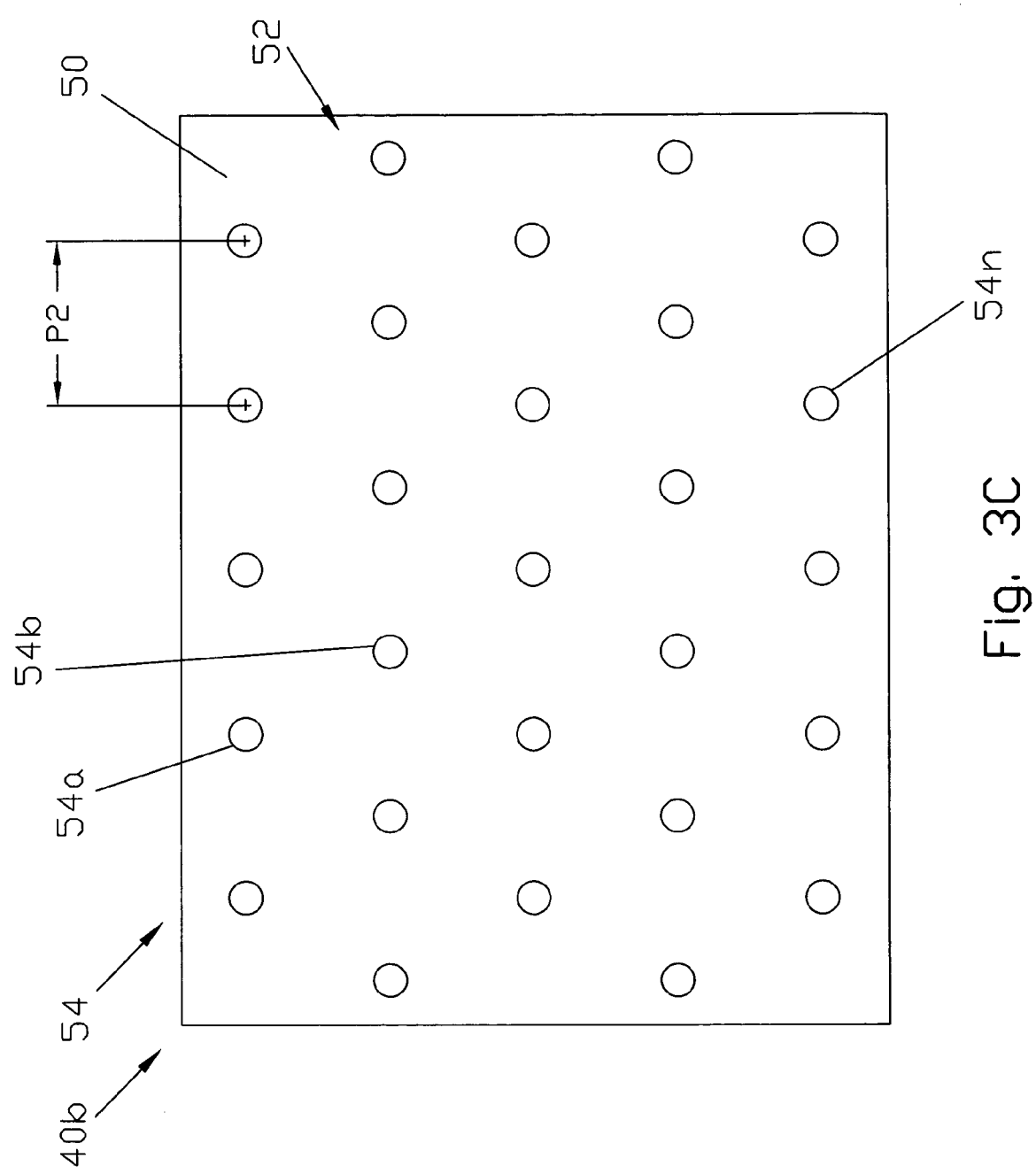
FIG. 3C is a view on the back side of the second sub-assembly in the direction opposite to arrow A of FIG. 1.

As shown in FIG. 3C, which is a view on the back side 50 of the sub-assembly 24 in the direction opposite to arrow A, the back side 50 may be coated with a light-impermeable coating 52, and openings 54a, 54b, . . . 54n that function as aperture-limitation diaphragms may be formed in the light-impermeable coating 52.

The aperture-limitation diaphragms 54a, 54b, . . . 54n may be of the same shape as the aperture-limitation diaphragms 32a, 32b, . . . 32n of the first sub-assembly 22 that in FIG. 2D are shown as circular openings.

An important part of the optical system 20 is a rear focal plane 56 of the first sub-assembly. This rear focal plane 56 of the first sub-assembly 22 will be further referred to as an intermediate image plane for the reasons explained below. The rear focal points of respective pairs of the microlenses 30a–34a, 30b–34b, . . . 30n–34n are located on the aforementioned rear focal plane 56 and create an individual intermediate image in this plane. The plane 56 is formed between the first sub-assembly 22 and the second sub-assembly 24. In fact, this intermediate image plane may coincide with the aforementioned back side 37 of the second microlens array 22b of the first sub-assembly 22 or with the flat front surface 42 of the first microlens array 40a of the second sub-assembly 24.

Let us assume that in the embodiment of the invention shown in FIG. 1, the intermediate image plane 56 is formed on the aforementioned back side 37 of the second microlens array 22b of the first sub-assembly 22. An important element of the optical system 20 of the invention is a field-limitation diaphragm array 60 that is formed in the aforementioned intermediate image plane, e.g. , in the form of light impermeable coating 39 with opening 62a, 62b, . . . 62n that function as the field-limitation diaphragms. These opening or diaphragms 62a, 62b, . . . 62n are coaxial with respective microlenses 30a, 30b, . . . 30n, 34a, 34b, . . . 34n and with the aperture-limitations diaphragms 32a, 32b, . . . 32n, respectively (FIG. 2A).

Similar to the aperture-limitations diaphragms, the field-limitation diaphragm openings 62a, 62b, . . . 62n may be circular or hexagonal (not shown).

In FIG. 1, reference numeral 64 designates a light-transmitting spacer made from a transparent optical material such as glass and located between the second microlens array 40b of the second microlens subassembly 24 and an image receiving element 66 such as a CCD/CMOS, e.g., of the type described in the previous patent application of the same applicant (U.S. Patent Application No. . . . ).

The second sub-assembly provides magnification of the individual images of the intermediate plane to the size of the final image that, as mentioned above, may be matched with the transverse dimension of the image-receiving element. Thus, each microlens channel of the second sub-assembly creates an enlarged final image of the remote object with superposition of these enlarged images onto each other. Accurate registering of the superimposed images is provided by the aforementioned predetermined ratio of pitches (P1/P2) and dimensions of the apertures. Accuracy of interposition of individual final images is extremely high, since it depends only on the accuracy of pitch ratio between the microlens channels and the deviation of the pitch in the array itself. As the current technology allows manufacturing of microlens arrays with pitch deviations of the order of the wavelength, it can be assumed that accuracy of interposition also will be of the order of diffraction distortion. This allows a very high resolution that in the case of conventional technique can be achieved only at the expense of very complicated and expensive constructions.

It should be noted that the second sub-assembly 24 has a front focal plane that, in fact, coincides with the aforementioned intermediate image plane 56, and a rear focal plane that, in fact, coincides with the final image plane IP.

Displacements of the microlenses 30a, 30b, . . . 30n, 34a, 34b, . . . 34n of the first sub-assembly relative to the microlenses 46a, 46b, . . . 46n, 48a, 48b, . . . 48n of the second sub-assembly are shown in FIG. 2a via designations of the respective pitches P1 and P2. These displacements constitute a unique feature of the optical system of the invention and makes it possible to interpose all individual images of the intermediate image plane 56 onto each other with high accuracy of image registering in the image plane 68 (FIG. 1) formed on the surface of the image receiving element 66.

The principle of image formation in the image plane of the compact optical system 20 of the invention will now be described with reference to FIG. 1 and FIGS. 4, 5, . . . , where the remote object to be imaged is not shown but is assumed to be located on the left side of the system in FIG. 1, and the image plane is designated by IP and is coincides with the back side of the light-transmitting spacer 64 or the front side of the image receiving element 66.

Figure 4:
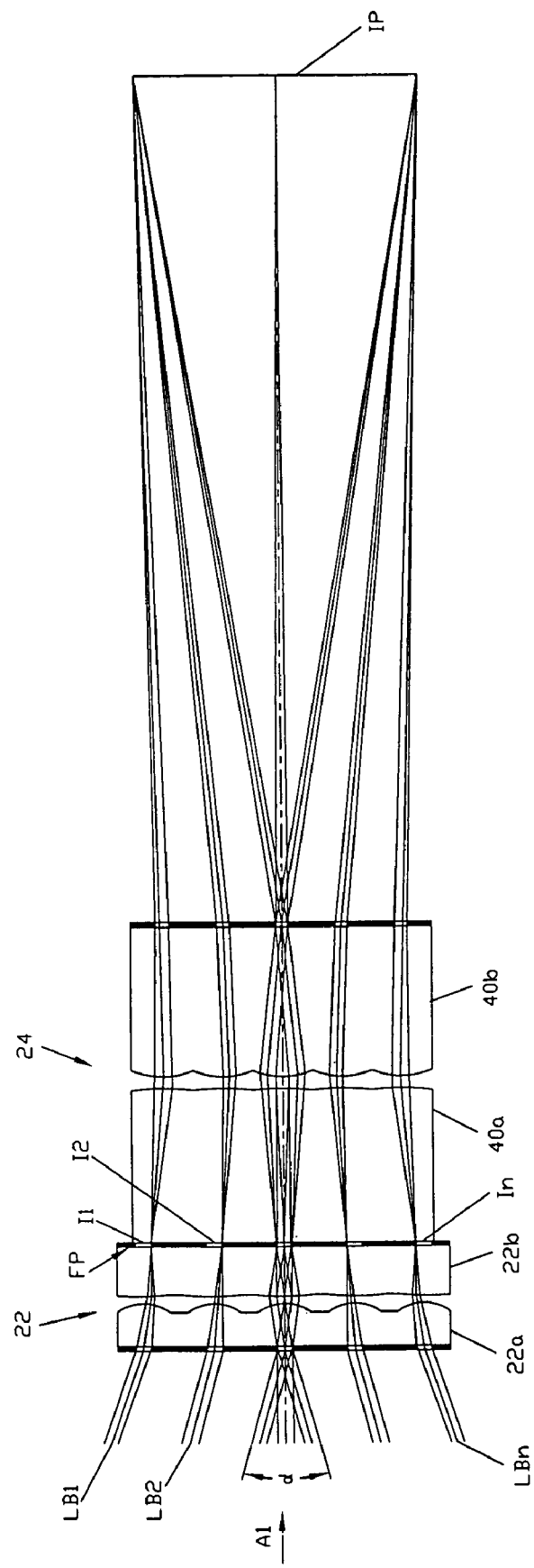
FIG. 4 is a simplified side view of the optical system similar to FIG. 1 but without some details in order not to obscure the ray tracing shown in FIG. 4.

FIG. 4 is a simplified side view of the optical system 20 similar to FIG. 1 but without some details in order not to obscure the ray tracing shown in FIG. 4. In particular, the diaphragms and microlenses are shown conventionally while the light-transmitting spacer 64 is not shown at all and is assumed to be located between the back side of the second sub-assembly 24 and the image plane IP.

The light beams LB1, LB2 . . . LBn reflected from the remote object (only light beams that correspond to maximal angles of the field of views are shown in FIG. 4) pass in the light propagation direction (arrow A1 in FIG. 4) through the aperture-limitation diaphragms 32a, 32b, . . . 32n (FIG. 1) and then through the respective microlenses 30a, 30b, . . . 30n, 34a, 34b, . . . 34n that are arranged with the same pitch P1 in the first microlens array 22a of the first sub-assembly 22 and in the second microlens array 22b, respectively. The aperture-limitation diaphragms 32a, 32b, . . . 32n (FIG. 1) divide the light into individual light beams that propagate along individual microlens channels. The axes of these individual microlens channels are shown in FIG. 1 and designated as 33a, 33b, . . . 33n, respectively. In the following description, the individual microlens channels will be designated by their axes 33a, 33b, . . . 33n. The image points of all aforementioned individual microlens channels are located on the back side 37 of the second microlens array 22b of the first sub-assembly 22 (FIG. 1). In fact, the aforementioned back side 37 coincides with the intermediate image plane FP (FIG. 4) of the sub-assembly 22. The intermediate image plane FP will contain a plurality of individual images I1, I2, . . . In of the remote object, and the number of these individual images I1, I2, . . . In is equal to the number "n" of the individual microlens channels 33a, 33b, . . . 33n. (FIG. 1).

Dimensions of the individual images I1, I2, . . . In are limited by the field-limitation diaphragms 62a, 62b, . . . 62n (FIG. 1). The individual images I1, I2, . . . In are created under conditions of aforementioned telecentricity that is achieved herein due to appropriate selection of a diameters of the aperture-limitation diaphragms 32a, 32b, . . . 32n and parameters of the microlenses of both arrays 22a and 22b.

The divided beams that carry the aforementioned images I1, I2, . . . In propagate further through the microlenses 46a, 46b, . . . 46n, 48a, 48b, . . . 48n of the first microlens array 40a and the second microlens array 40b of the second sub-assembly 24 and further via the aperture-limitations diaphragms 54a, 54b, . . . 54n (if such diaphragms are available) and the light transmitting spacer 64 to the image plane IP (FIG. 4). It has been noted that microlenses 32a, 32b, . . . 32n, 34a, 34b, . . . 34n of the first sub-assembly 22 and microlenses 46a, 46b, . . . 46n, 48a, 48b, . . . 48n of the second sub-assembly 24 have different pitches P1 and P2, respectively. Therefore, the microlenses 46a, 46b, . . . 46n, 48a, 48b, . . . 48n and of the second sub-assembly 24 and their respective aperture-limitations diaphragms 54a, 54b, . . . 54n (if such diaphragms are available) form the second set of the individual microlens channels that are shown in FIG. 1 in the form of their axes 35a, 35b, . . . , 35n. These channels of the second set will be further designated by their respective axes. In view of difference in pitches P1 and P2 the individual microlens channels 35a, 35b, . . . , 35n will be shifted relative to the individual microlens channels 33a, 33b, . . . 33n (FIG. 1). However, the respective channels of both sub-assemblies that are designated by the same subscripts "a", "b" . . . "n" are conjugated, i.e., the beams of the channels 33a transfer to the channel 35a, the beams of the channels 33b transfer to the channel 35b, etc.

The light beams of the second sub-assembly are focused on the aforementioned image plane IP where all individual microlens channels 35a, 35b, . . . 35n create a plurality of one and the same image of the remote object so that all these images coincide with each other with high accuracy. The effect of superposition of the images onto each other is achieved by selecting an appropriate ratio of pitches P1 and P2. This selection is defined by specific formulae derived by the inventors and described below.

As has been mentioned above, the intermediate image plane 56 (FIG. 1) contains a plurality of individual images I1, I2, . . . In, the number of which corresponds to the number of the individual microlens channels. FIG. 5 is a partial view of the system of FIG. 1 with three individual microlens channels 35a, 35b, and 35c. The partial view of FIG. 5 shows only a part 24' of the second sub-assembly 24. In FIG. 5 the three individual images I1, I2, and I3 that have been localized on the front side 42 of the second sub-assembly are shown as identical segments AB. Since all these segments AB have pitch P1, while the axes 35a, 35b, 35c of the microlenses of the second set have different pitch P2, positions of the individual intermediate images I1, I2, and I3 (segments AB) will be shifted relative to the respective axes 35a, 35b, 35c individually. In other words, while the center of the individual image I2 coincides with the central axis 35b (FIG. 5), in the neighboring channels the center points of the segments AB will be shifted relative the respective channels 35a and 35c by a value that depends on the difference between pitches P1 and P2. It is understood that the aforementioned neighboring images will be shifted relative to the respective channels in the opposite directions.

By selecting the optical parameters of the second sub-assembly, it is possible to provide coincidence of the individual final images A'B' (FIG. 5) interposed onto each other in the image plane IP.

Let us consider the relationship between the pitches P1 and P2 that satisfies the condition of interposition of the final images A'B' onto each other without relative displacements.

Figure 5:
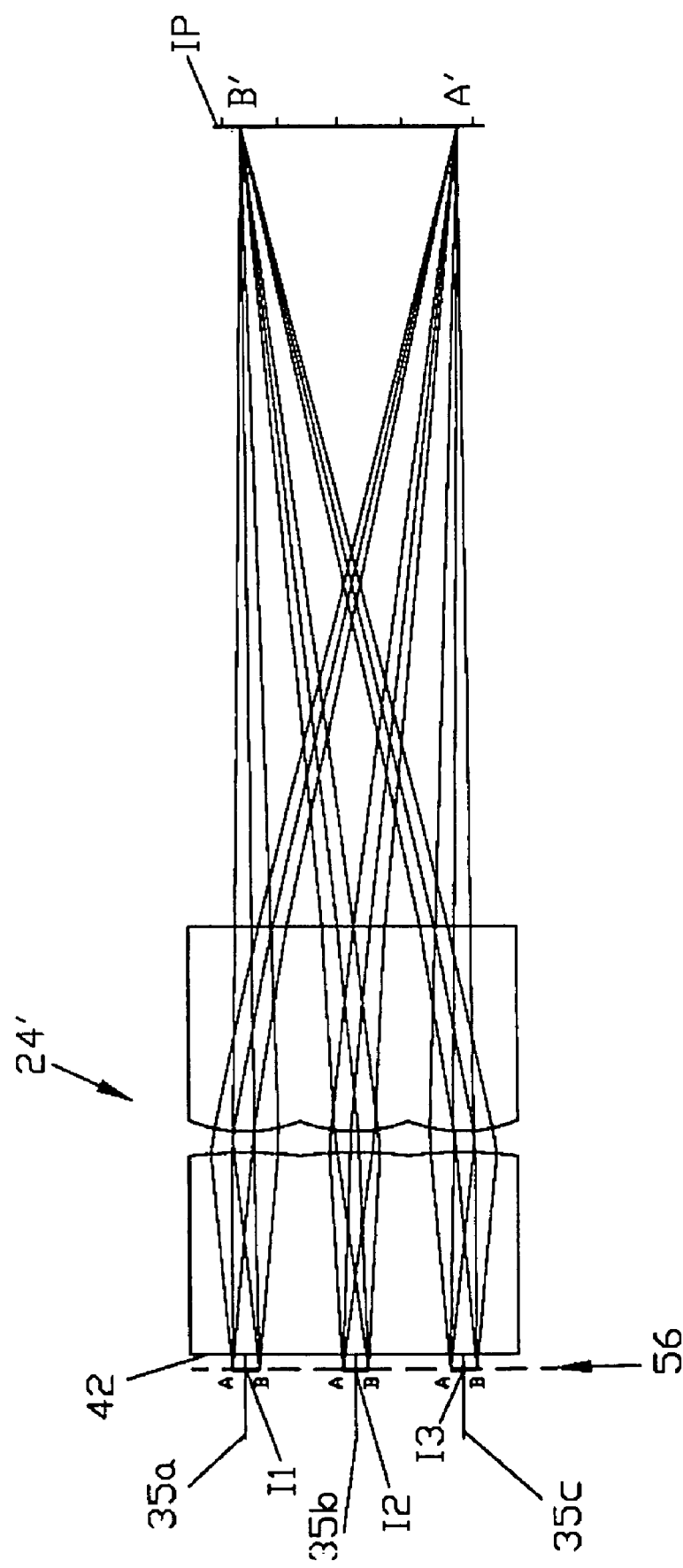
FIG. 5 is a partial view of the system of FIG. 1 with three individual microlens channels.
Figure 6:
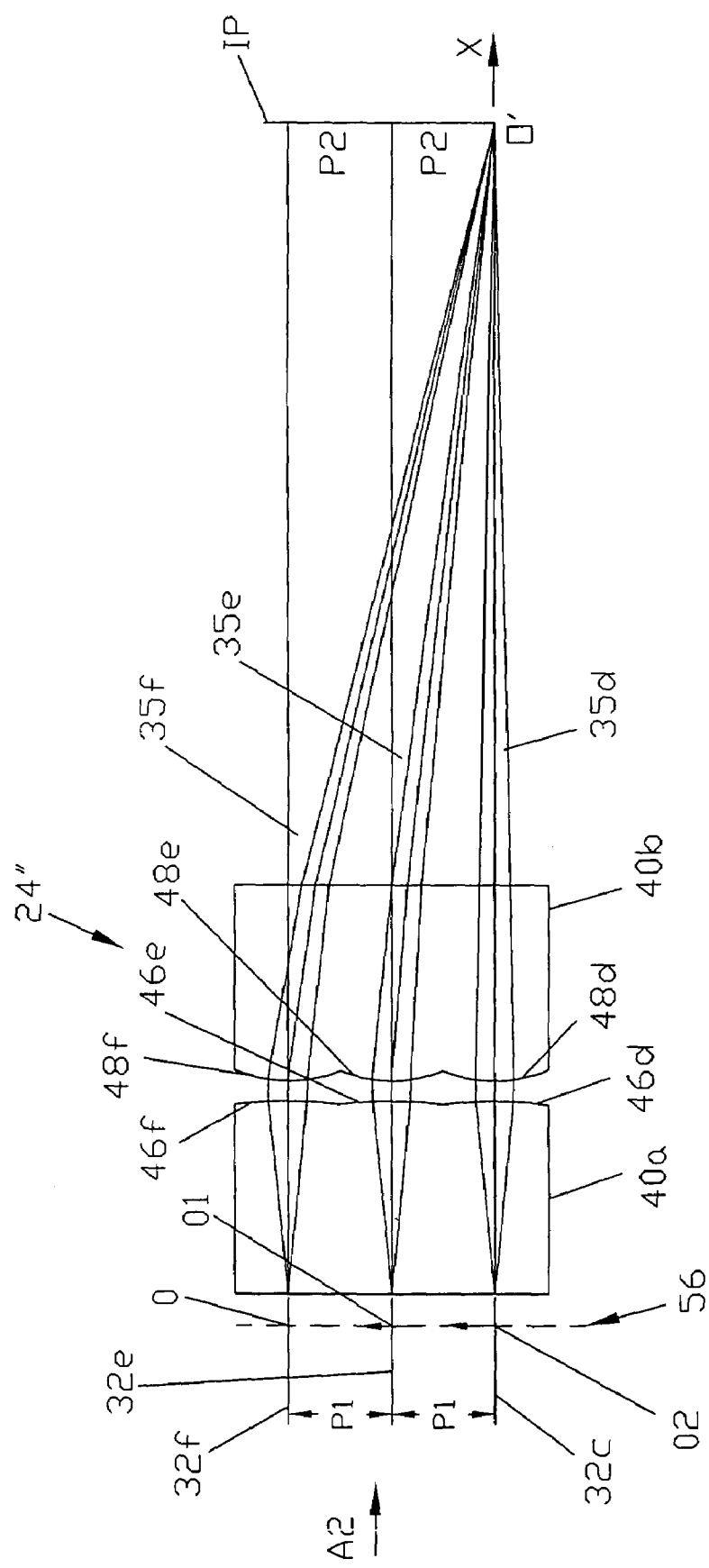
FIG. 6 is a view similar to FIG. 5 that shows a fragment with three arbitrarily selected neighboring microlenses of the first microlens array of the second sub-assembly.
Figure 7:
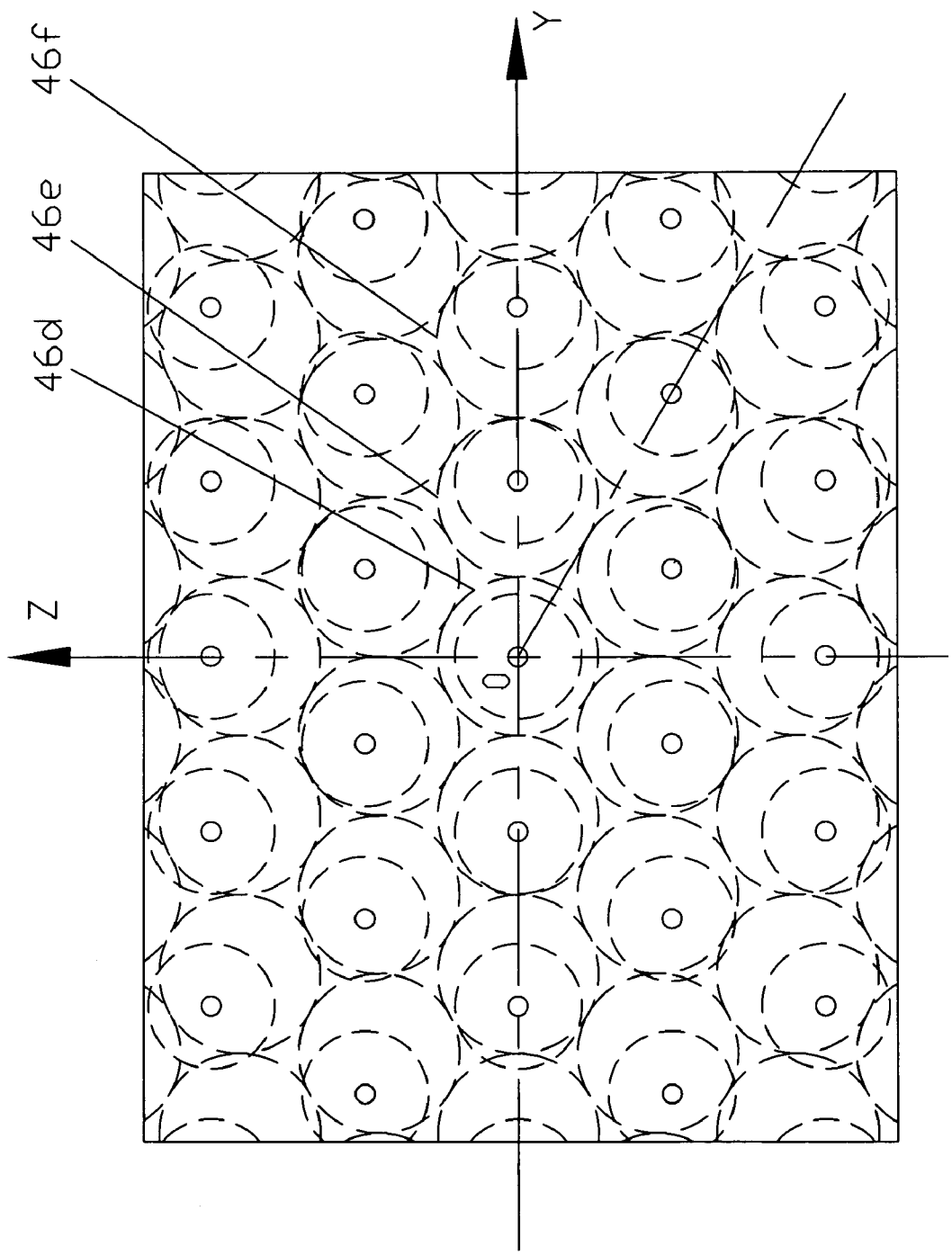
FIG. 7 is a view on the microlenses of FIG. 6 in the direction of arrow A2 of FIG. 6.

FIG. 6 is a view similar to FIG. 5 that shows a fragment 24" with three arbitrarily selected neighboring microlenses 46d, 46e, and 46f of the first microlens array 40a and microlenses 48d, 48e, and 48f of the second microlens array 40b of the second sub-assembly 24. As shown in FIG. 7, which is a view on this microlenses in the direction of arrow A2 of FIG. 6, all three pairs of microlenses 46d–48d, 46e–48e, and 46f–48f are arranged on the same radial line OY in the plane perpendicular to the microlens channel axis 35d, 35e, and 35f (FIG. 6). In FIG. 7, the coordinates of certain identical points on the segment images associated with respective microlenses are shown on the radius OY as y3, y2, and y1. It is understood that the centers of the microlenses 46d–48d, 46e–48e, and 46f–48f, i.e., the axes 35d, 35e, and 35f are spaced with pitch P2. As has been mentioned above, pitches P1 and P2 are different, and in the embodiment of FIGS. 6 and 7, pitch P1 is greater than P2. This difference is seen in FIG. 2A. In FIG. 6, the axes of conjugated microlens channels (FIG. 1) of the first sub-assembly 22 are designated as 32d, 32e, and 32f. In FIG. 6, the axes 32d and 35d, which are axes of the central channels of both sub-assemblies coincide.

It should be recalled that the microlenses of the first sub-assembly 22 form in the intermediate image plane 56 a plurality of individual images equally spaced from each other with pitch P1. The number of such individual images equals the number of microlens channels. In order to interpose all these individual images onto each other in the image plane IP of the second sub-assembly, it is required that all points of these images that are located on the microlens channel axes 32d, 32e, and 32f of the first-subassembly are projected into the common point O' of the final image produced by the microlenses of the second sub-assembly. It is understood that only the central point O of the central channels 32d and 35d will be transformed without lateral displacement.

Coordinates of point O1 (FIG. 6) on the axis 32e of the first sub-assembly will be transferred by the microlenses 46e and 48e of the second sub-assembly to the point O' in image plane IP, and the coordinate of this point O1 relative the point O' will be determined by the following formula:

$$O1 = P2 + P2/V \quad (1)$$

where V is an enlargement/reduction factor of the channel 35e.

Coordinates of point O2 (FIG. 6) on the axis 32d of the first sub-assembly will be transferred by the microlenses 46d and 48d of the second sub-assembly to the point O' in image plane IP, and the coordinate of this point O2 relative the point O' will be determined by the following formula:

$$O2 = 2P2 + 2P2/V \quad (2),$$

where V is an enlargement/reduction factor of the channel 35d.

Coordinates of point On on the axis 32n of the first sub-assembly will be transferred by the microlenses 46n and 48n of the second sub-assembly to the point O' in image plane IP, and the coordinate of this point On relative the point O' will be determined by the following formula:

$$On = nP2 + nP2/V,$$

where V is an enlargement factor of the channel 35n.

Although the embodiments described in this patent specification consider the case of enlargement of the images transferred from the first sub-assembly to the image plane, the same relationships are applicable for the case of reduction, where V<1.

By subtracting (1) from (2), one can obtain a relationship between pitches P1 and P2, i.e., $$(2P2 + 2P2/V) - (P2 + P2P2/V) = P1 = P2 + P2/V \quad (3).$$

The aforementioned relationships between pitches P1 and P2 are valid for microlenses on any radii of FIG. 7 in the plane XY perpendicular to axis X—X of FIG. 1.

Although the above procedure was shown for points on the microlens channels 32a and 32n of the first sub-assembly 22, the same concept is applicable for analysis of any identical points of individual images that are located in the intermediate image plane 56 of the first sub-assembly 22 and are spaced from each other with pitch P1 to the common point of the identical images in the image plane IP.

Although the above analysis was conducted for the case when the central axis of the system passes through the center of the central microlens, the same relationships between the identical points of the neighboring identical images will be valid for the analysis where the axes of the channels pass, e.g., through the point at equal distances between the neighboring microlenses in the plane perpendicular to the channels. Moreover, the aforementioned relationships between the positions and transfer of the identical points of the neighboring identical images will the same for axes, positions of which in the microlens array are arbitrarily selected.

Moreover, although the above analysis was conducted for hexagonal arrangement of the microlenses shown in FIGS. 1 to 8, the same principles and analysis are applicable for the case of square arrangement of microlenses in the microlens arrays.

Figure 8:
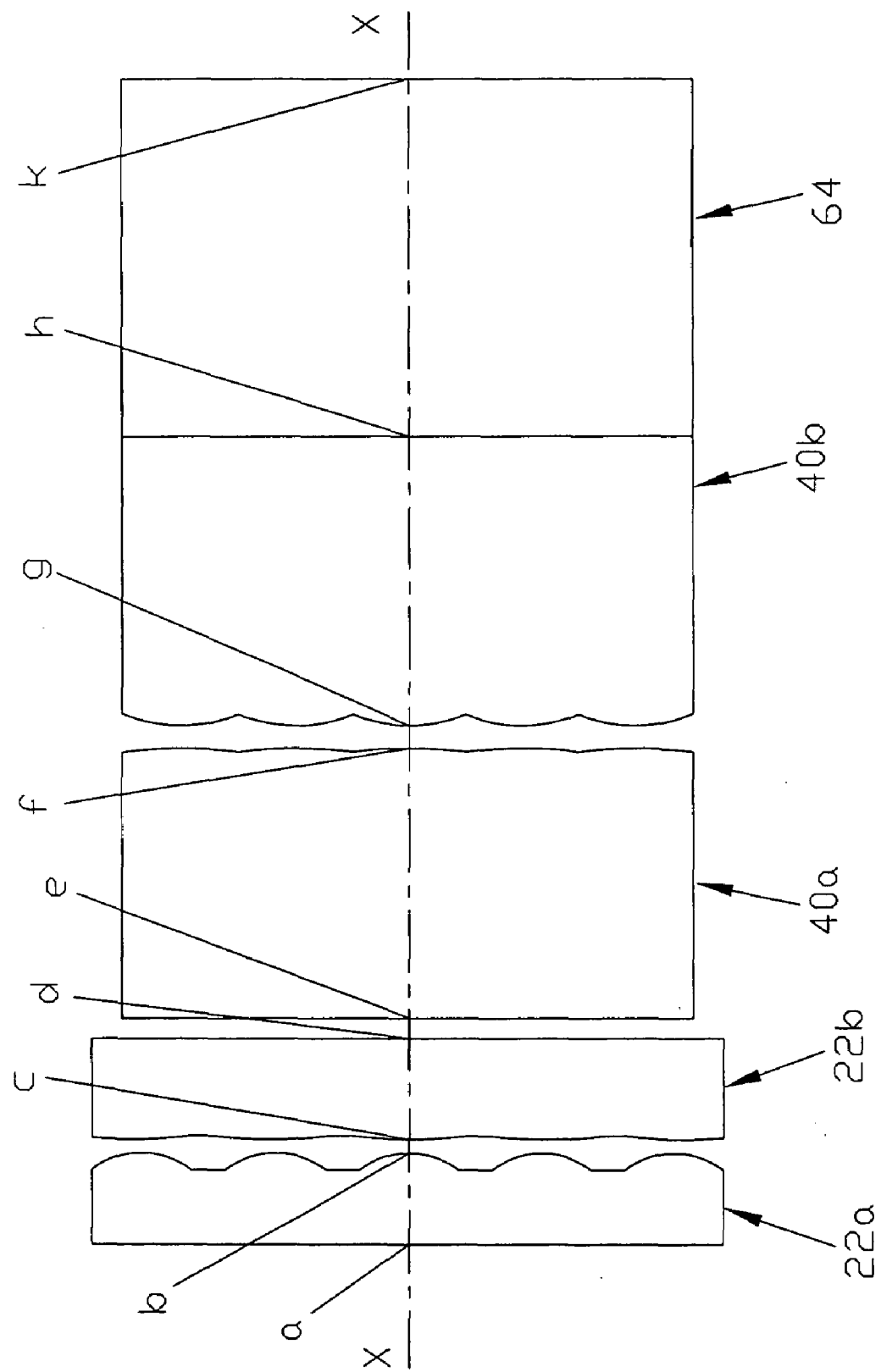
FIG. 8 is a side view of the optical system made in accordance with one embodiment of the invention.

A specific example of parameters of the optical system 20 formed on the principles of the present invention are shown in Table 1 below. Positions of points of intersection a, b, c, d, e, f, g, h, k are shown in FIG. 8, which is a side view of the optical system made in accordance with embodiment of the invention.

TABLE 1

| Point of intersection | Rad (mm) | Thickness (mm) | Clear Aperture (mm) | Refractive Index | Dispersion |
|---|---|---|---|---|---|
| a | 0.0000 | 0.23 | 1.5 | 1.56 | 49.6 |
| b | −0.120ar | 0.15 | 1.5 | — | — |
| c | 0.2625ar | 0.20 | 1.5 | 1.56 | 49.6 |
| d | 0.000 | 0.026 | 1.5 | — | — |
| e | 0.000 | 0.600 | 1.30 | 1.56 | 49.6 |
| f | −1.1324ar | 0.04 | 1.30 | — | — |
| g | 0.2675ar | 0.60 | 1.30 | 1.56 | 49.6 |
| h | 0.0000 | 3.93 (air) | 1.30 | — | — |
|   | 0.000 | 6.10 (glass) | 1.30 | 1.56 | 49.6 |

In the above table:

ar—designates "aspherical";

Conical constants for profiles of aspherical lenses: $k_b=-0.25$; $k_c=-9.9$;

$k_f=-0.86$; $k_g=-0.63$;

Rad—is a curvature radius of the surface or radius of the microlens;

In accordance with tradition optical designations, 0.0000 designates a plane or a radius equal to infinity.

P1=275 μm

P2=250 μm

The objective as a whole has the following characteristics:

Focal length F=1.5 mm

Field of view (FOV)=44.5°

$F_{no}$=1.8

2y=130 μm (the size of the intermediate images).

V=10×

The objective operates as follows:

A pair of microlens arrays b and c of the sub-assembly 24 form in a common image plane complete images of an object located at infinity. Each microlens channel forms an image field having dimension of 2y=2tgFOV*F'. For the aforementioned FOV=44.5°, F'=150 μm, the size of the final intermediate images will be 2y=130 μm. The focus of the entire optical system with an intermediate image is equal to the product of the focus of the first sub-assembly 22 by the magnification factor of the second sub-assembly 24. Thus, we obtain that with the focus F' of the first sub-assembly equal 150 μm and the magnification factor of the second sub-assembly V=−10×, the focus of the entire system is F=1500 μm, i.e., 1.5 mm.

Thus, it has been shown that the invention provides an optical system for undistorted imaging of remotely located objects that has a total optical path length much shorter than the conventional optical systems of the same optical characteristics, can be easily matched with standard image receiving and processing units such as CCD/CMOS, or any other arrayed receiver, and can be embodied with optical characteristics selected in a wide range without limitations to apertures, images sizes, field views, etc.

Although the invention has been described with reference to specific embodiments, it is understood that this embodiment should not be construed as limiting the application of the invention, and various changes and modifications are possible, provided they do not depart from the scope of the patent claims. For example, parameters of the optical system given in Table 1 correspond only to a specific example and will be different for the similar system with pitches different from the pitches P1 and P2 given in the table. The second sub-assembly can be used without the aperture-limitations diaphragms on the back side of this sub-assembly. The optical layer components may be made from different optical materials. The microlens arrays may have different cross sectional configuration, e.g., square, rectangular with different pitches in the mutual perpendicular directions, etc. The embodiment with magnification of the image between the intermediate plane and the final image plane (i.e., with P2<P1) was given only as an example, and the system may have P1 greater than P2 with reduction of the images transferred from the intermediate image plane to the final image plane.

The invention claimed is:

1. A compact optical assembly for imaging a remote object comprising:
   a first optical sub-assembly comprising at least one optical lens array of first optical lenses arranged with a first pitch P1, said first optical sub-assembly having a rear focal plane for creating intermediate individual images of said remote object by said first optical lenses; and
   a second optical sub-assembly comprising at least two optical lens arrays of second optical lenses arranged with a second pitch P2 that is different from pitch P1, said second optical sub-assembly having a front plane that coincides with said rear focal plane of said first sub-assembly and a rear focal plane for creating a final single image of said remote object with a predetermined magnification/reduction factor by interposing said intermediate individual images onto one another without relative displacement.

2. The compact optical assembly of claim 1, wherein said pitch P1 and pitch P2 have the following relationship: P1=P2+P2/V, where V is the magnification/reduction factor of said second sub-assembly.

3. The compact optical assembly of claim 1, wherein said first sub-assembly comprises a first lens array and a second lens array, said first lens array of said first sub-assembly having a front side and first aperture-limitation diaphragms on said front side that are aligned with respective lenses of said first lens array of said first sub-assembly.

4. The compact optical assembly of claim 3, wherein said pitch P1 and pitch P2 have the following relationship: P1=P2+P2/V, where V is the magnification/reduction factor of said second sub-assembly.

5. The compact optical assembly of claim 4, further comprising field-limitation diaphragms formed in said rear focal plane of said first sub-assembly, said field-limitation diaphragms being aligned with said first aperture-limitation diaphragms.

6. The compact optical assembly of claim 5, wherein said second lens array has a rear side and second aperture-limitation diaphragms on said rear side that are aligned with respective lenses of said second lens array of said second sub-assembly.

7. The compact optical assembly of claim 1, further comprising field-limitation diaphragms formed in said rear focal plane of said first sub-assembly, said field-limitation diaphragms being aligned with said first aperture-limitation diaphragms.

8. The compact optical assembly of claim 5, wherein said pitch P1 and pitch P2 have the following relationship: P1=P2+P2/V, where V is the magnification/reduction factor of said second sub-assembly.

9. The compact optical assembly of claim 8, wherein said first sub-assembly comprises a first lens array and a second lens array, said at least two optical lens arrays of second optical lenses comprise a first lens array and a second lens array, said second lens array has a rear side and second aperture-limitation diaphragms on said rear side that are aligned with respective lenses of said second lens array of said second sub-assembly.

10. The compact optical assembly of claim 9, wherein said first optical lenses and said second optical lenses have shapes selected from the group consisting of a round shape and a hexagonal shape.

11. The compact optical assembly of claim 9, further comprising an image-receiving element for receiving said final single image from said second sub-assembly.

12. The compact optical assembly of claim 11, wherein said image-receiving element is selected from the group consisting of a CCD and CMOS.

13. The compact optical assembly of claim 1, wherein said first sub-assembly comprises a first lens array and a second lens array, said at least two optical lens arrays of second optical lenses comprise a first lens array and a second lens array, said second lens array has a rear side and second aperture-limitation diaphragms on said rear side that are aligned with respective lenses of said second lens array of said second sub-assembly.

14. The compact optical assembly of claim 1, wherein said first optical lenses and said second optical lenses have shapes selected from the group consisting of a round shape and a hexagonal shape.

15. The compact optical assembly of claim 14, wherein said first optical lenses and said second optical lenses have shapes selected from the group consisting of a round shape and a hexagonal shape.

16. The compact optical assembly of claim 1, further comprising an image-receiving element for receiving said final single image from said second sub-assembly.

17. The compact optical assembly of claim 16, wherein said image-receiving element is selected from the group consisting of a CCD and CMOS.

18. A method of forming an image of a remote object in a final image plane comprising:
providing an optical system that comprises a first sub-assembly of optical lens arrays with first optical lenses arranged with a first pitch P1 and a second sub-assembly of optical lens arrays with second optical lenses arranged with a second pitch P2 that is different from said first pitch P1, said first sub-assembly having a rear focal plane, said second sub-assembly having a front focal plane that coincides with said rear focal plane of said first sub-assembly and a rear focal plane that coincides with said final image plane, wherein said pitch P1 and pitch P2 have the following relationship: P1=P2+P2/V, where V is the magnification/reduction factor of said second sub-assembly;
creating a plurality of individual images in said rear focal plane of said first sub-assembly with the use of said first optical lenses;
creating a plurality of identical final images of said remote object in said image that are interposed onto each other without displacement by transferring said plurality of individual images from said rear focal plane of said first sub-assembly with said magnification/reduction factor V.

19. The method of claim 18, further comprising the step of providing said optical system with an image-receiving element that receives said image of said remote object from said image plane for subsequent processing.

* * * * *